No. 6840 Reissued Jan. 4, 1876
J. KIDDER.
ELECTROMAGNETIC MACHINE.
Fig. X
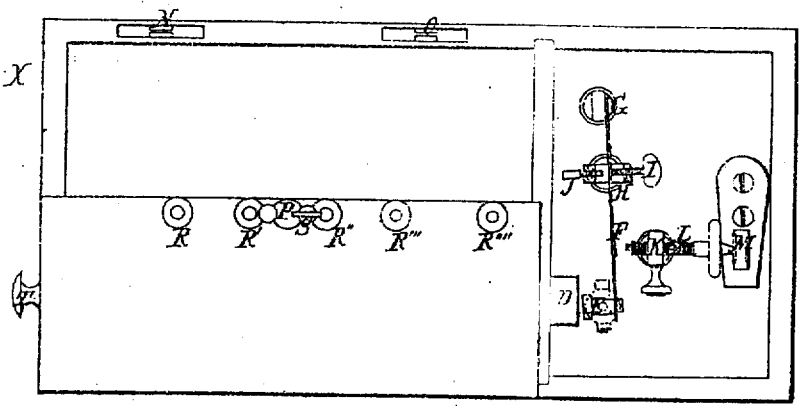
Fig. X'
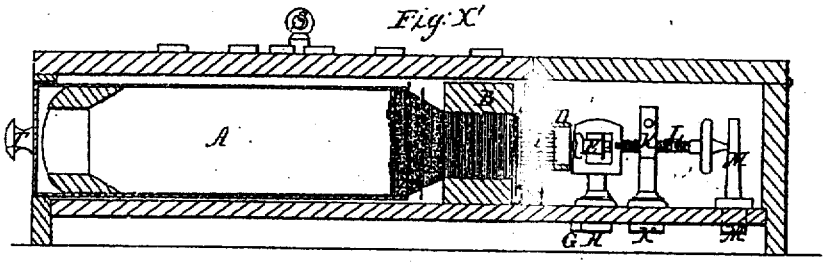
Fig. X''
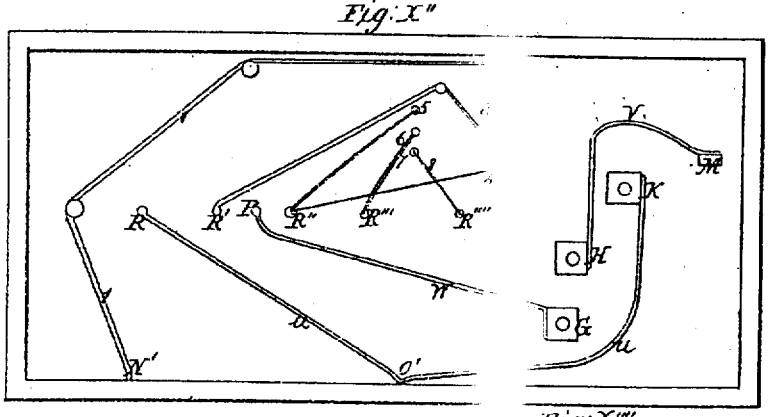
Fig. X'''
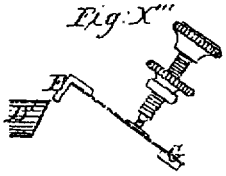
Fig. X''''
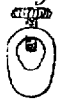
Witnesses;
Fred Hayes
D M Cornelly
Inventor;
J Morris Kidder

UNITED STATES PATENT OFFICE.

JEROME KIDDER, OF NEW YORK, N. Y.

IMPROVEMENT IN ELECTRO-MAGNETIC MACHINES.

Specification forming part of Letters Patent No. 93,625, dated August 10, 1869; Reissue No. 6,840, dated January 4, 1876; application filed November 1, 1873.

*To all whom it may concern:*

Be it known that I, JEROME KIDDER, of the city, county, and State of New York, have invented certain new and useful Improvements in Electro-Magnetic Machines; and I do hereby declare that the following is a full, clear, and exact description of the same, reference being had to the accompanying drawings, forming part of this specification, in which—

Figure X is a plan view of machine with my improvements, having the covers removed. Fig. X′ is a vertical longitudinal section of the same. Fig. X″ is an inverted plan, showing the connections of the different circuits. Fig. X‴ exhibits a modification of the vibrating armature, which constitutes one of the features of my invention. Fig. X⁗ is a face view of a movable hammer-head or piece to be used on the vibrating armature.

My invention consists, first, in interposing a helix into the primary circuit of an electro-magnetic machine, in addition to the helix used for the principal primary circuit, said additional helix being for the purpose of reducing the power of the induced currents by its office of reducing the primary current, by acting as a resisting medium to the same. It also consists in arranging a vibrating armature (which, by its oscillations, breaks the primary current,) in such a manner that the end of the hammer in its oscillations will pass by the end of the iron electro-magnet, that attracts it without striking said magnet, so that there will be no impediment to the synchronous regularity of the interruptions.

My invention further consists in a point for connection with spring to close the battery-circuit, so arranged that the alternate connection by the vibrating spring can be changed to a permanent connection of support to shorten the spring, and so vary, in a greater degree, the rapidity or slowness of the vibrations or oscillations of said spring.

My invention consists, further, in having three or more coils of three or more different lengths and thicknesses of insulated wire with an electro magnet, and with movable magnet or a movable closed circuit, as a power-adjuster, so as to have a more desirable variation of the qualities of the currents developed.

My invention also consists of a method of supporting the helix by clasping the coils of thicker wires at or near one end of said helix, thus providing a convenient and proper support of coils, whose electric powers are varied by a movable closed circuit.

To more fully illustrate my invention in diagram X′, A is a system of helices of four coils of wire. B is a clasp of wood, but may be of any suitable material. Being itself fixed, it supports the helix altogether at or near one end by clasping firmly the coils of coarse wire Y, which have their longitudinal hollow axis snugly filled with the iron wires C, composing the electro-magnet; D, a hollow cap of sheet-iron, driven on the end of the wires. D, Fig. X‴, is another form of the end of the electro-magnet C, when the cap D, in Fig. X′ is omitted; E, a hammer, fastened to F, an oscillating spring; G, a metallic support of fastening of the spring; H, a metallic rest, with a platinum-pointed screw, I, and a metallic screw, J; K, a metallic support to I, a platinum-pointed metallic screw; M, a metallic standard. N and O are metallic pieces, with saw-cuts in top, which pieces pass through the side of the box, connect with the wires N′ O′ underneath. P is a metallic part passing through the box, and connecting with the wire W underneath. R R′ R″ R‴ R⁗ are also metallic posts or parts, passing through the box and connecting with wires underneath. The wire N′ connects with the first end 1 of the primary coil of wire in the helix. The wire O′ connects with R and K. W is a wire, which connects P with G.

1 is the first end of the first or inner coil of the helix, for the primary current, which wire is insulated, and after traversing with convolutions the length of the helix and back again, appears at 2, and is thence continued and joined with the metal R′. 3 is the first end of a coil of finer wire, joined with the wire 2, and after passing with its convolutions the length of the helix, and back again, appears at 4, and is thence continued and joined with R″. 5 is the first end of a still smaller insulated wire, joined also with R″, and after passing with its convolutions twice backward and forward nearly the whole length of the helix, appears at 6, and is joined to R‴. 7 is the first end of a still finer coil of insulated wire, which, after passing with its convolutions several times the length of the helix, appears at 8, and is joined to R''''.

T is the knob on the end of a copper tube, T', which closes over the series of coils A, and is adjustable longitudinally to vary the power of the induced currents. U is a wire, connecting R and O' and K. V is a wire, connecting M and H.

The machine operates thus: The plug S, closing with P and R''; the screw L, turned to close K with M, and the screw I touching the spring F; the screw J turned back so as not to touch this spring when it oscillates; the battery being connected with its positive pole at N' and its negative at O'.

It will be seen that the positive current or influence from the battery traverses, enters the inner helix of coarsest wire, and coming out at 2, again enters the helix wire 3, and comes out at 4; thence passes along the connected metallic mediums R, S, P, W, G, F, I, H, V, M, L, K, U and O', and thence to the negative of the battery.

The induced currents on the coils of wire, as is well known, are produced by the interruption of the primary circuit, which interruption is caused by the magnetized ring D attracting the hammer E, so as to draw the spring away from the screw I.

It will be seen that the hammer, in its oscillations, will not strike the ring D, but will pass within the cylinder formed by it, thus avoiding a jarring noise and harsh vibrations, which belong to and are not avoided in the common forms of electrical apparatus. Another form of this same principle is shown and recognized in the Fig. X, where the hammer E, though near the magnet O, will not strike the magnet in its oscillations. Also, the hammer could be a tube vibrating over a narrowed point or portion of the magnet.

It will be further seen in Fig. X, if the screw L be turned so as to touch the spring F and removed from M, and if the screw J be turned so as to bind the spring F firmly against the screw I, then the length of the oscillating portion of this spring is shortened, and makes more rapid vibrations.

It will be further seen that if the metallic plug S be removed from P R'', and placed so as to close P R', then the primary current will traverse only the inner coil of coarsest wire, leaving out of its circuit the next added resisting coil of finer wire, the result of which will be to make the power of the induced currents of immense power, because of a better adapted proportion for the great power required in some cases. As the tube T will not, in this latter case, cut off all this power by being introduced, it will be seen that the arrangement to close the battery through one or more coils will better facilitate the adaptation of the power of electrical currents to the varied therapeutical demands of electricity.

What I claim as new is—

1. An additional helix, introduced into the primary circuit of an electro-magnetic machine, operating substantially as and for the purpose herein set forth.

2. The arrangement of the hammer E, so that in its oscillations one end will pass by the end of the iron electro-magnet D or D', substantially as and for the purpose specified.

3. The additional point of fixture of the spring to be free or fixed, at option, as at H, constructed and operating substantially as and for the purpose herein set forth.

4. Three or more coils of wire of different length and thicknesses, in combination with the electro-magnet C, with the tube T' or its equivalent, and with the metallic parts R R' R'', &c., substantially as and for the purpose set forth.

5. The clasp B, supporting the helix, in the manner described.

JEROME KIDDER, M. D.

Witnesses:

T. B. MOSHER,

O. D. MUNN.